2,872,394
RECOVERY OF URANIUM FROM TUNGSTEN

Kenneth Newnam, Angola, Ind., assignor, by mesne assignments, to the United States of America as represented by the United States Atomic Energy Commission No Drawing. Application August 1, 1946
Serial No. 687,720

6 Claims. (Cl. 204—105)

This invention relates to the recovery of uranium from tungsten and particularly to the recovery of uranium which has adhered to tungsten parts in apparatus for the electromagnetic separation of uranium isotopes.

The primary object of the present invention is the provision of a process for reclaiming uranium from tungsten parts.

Another object of the invention is to provide such a process which is suitable for processing fairly large quantities of material.

Other objects and advantages of the invention will become apparent from the following detailed description of how the process of the invention may be practiced.

In accordance with one embodiment of the invention, the tungsten articles having uranium associated therewith are dissolved electrolytically in a 10–20 percent NaOH solution using the tungsten articles as the anode and a platinum gauze cathode. The resulting solution containing soluble sodium tungstate and an insoluble slime is filtered. The slime residue is ignited successively with sodium nitrate and sodium pyrosulfate and leached, and the resulting filtrates are combined with the original filtrate. The uranium is recovered from the combined filtrates by diuranate precipitation and ether extraction. Uranium is recovered from the platinum cathode by standard procedures.

In accordance with another embodiment of the invention, the tungsten article is dissolved electrolytically as above and the slime separated from the filtrate. The slime is fused with sodium acid sulfate, leached, again fused and leached, and the combined filtrates are treated to precipitate ammonium uranate. Further uranium is recovered from the fused slime residue by further fusing with sodium nitrate, leaching and electrolysis. Uranium is recovered from the filtrate by electrolytic deposition on a platinum electrode.

The last-mentioned embodiment is the one preferred for large scale use and will now be described in detail.

The tungsten piece or pieces are made the anode in a 10–20% NaOH solution provided with a platinum gauze cathode. One thousand grams of NaOH pellets in two and one-half gallons of water is sufficient. A direct current is then passed through the solution until all of the tungsten likely to contain uranium is dissolved. In the case of tungsten from apparatus used for separating the isotopes of uranium the amount needed to be dissolved is usually between one and two percent of the tungsten by weight. Tungsten dissolves anodically very near the theoretical rate of 1.14 grams per ampere hour and 184 parts of tungsten react with eighty parts of NaOH to form a soluble sodium tungstate which is separated from the insoluble slime by filtration. This filtrate, containing a portion of the uranium, is electrolyzed and the uranium deposited on a platinum electrode. This electrode, as well as the platinum electrode from the first electrolysis, is treated with nitric acid to dissolve the uranium therefrom.

The largest amount of uranium is in the insoluble "anode slime" residue and is recovered by fusing with sodium acid sulfate, leaching with water, and filtering. The residue is then again fused with sodium acid sulfate, leached and filtered. These two filtrates are treated with excess ammonium hydroxide to precipitate ammonium diuranate. This diuranate may be converted to $U_3O_8$ by any well known treatment.

The residue from the second fusion may be fused with sodium nitrate, leached and filtered. The residue from this filtration, which may contain about 10% of the original uranium, is then recycled through the same steps as was the "anode slime" residue.

While particular procedures for practicing my invention have been described above, other procedures may be followed. For instance, any alkali metal hydroxide solution may be utilized as a solvent for receiving the electrolytically dissolved tungsten. Examples of such solutions are solutions of potassium hydroxide, lithium hydroxide, rhubidium hydroxide and caesium hydroxide, as well as the sodium hydroxide solution mentioned above. Particularly advantageous results have been obtained with sodium hydroxide solutions.

While the concentration of the alkali metal hydroxide solution may vary depending, among other things, upon the alkali metal hydroxide, the article to be dissolved, the conditions of electrolysis and the like, generally speaking, a 5–40% solution gives advantageous results. Particularly advantageous results have been obtained utilizing a 10 to 20% solution.

In lieu of the sodium nitrate and sodium pyrosulfate employed for fusing the slime obtained in the first-mentioned embodiment of my invention, other alkali metal salts such as potassium nitrate, potassium sulfate, lithium nitrate, and the like may be employed.

Likewise other alkali metal salts may be utilized in place of the sodium acid sulfate utilized to fuse the slime in the preferred embodiment of my invention. For example, potassium bisulfate, lithium bisulfate, and the like may be employed.

It is to be understood that all matters contained in the above description and examples are illustrative only and do not limit the scope of this invention, as it is intended to claim the invention as broadly as possible in view of the prior art.

I claim:

1. A method of reclaiming uranium from a tungsten article having uranium disposed in the outer portions thereof which comprises electrostripping said article in an aqueous alkali metal hydroxide solution to obtain a uranium containing solution admixed with insoluble material containing uranium, and recovering said uranium from said solution and said insoluble material.

2. A method of recovering uranium from a tungsten part employed in the electromagnetic separation of uranium isotopes which comprises immersing said part in an aqueous alkali metal hydroxide solution, passing a current through said part to obtain a uranium containing solution admixed with insoluble material containing uranium, separating said insoluble material from said solution, fusing said insoluble material with a molten inorganic salt of an alkali metal, effecting an aqueous leach of said fused material to obtain a second uranium containing solution, and recovering uranium from said uranium containing solutions.

3. A method of reclaiming uranium from a tungsten part employed in the electromagnetic separation of uranium isotopes which comprises electrostripping said part in an aqueous 5–40% alkali metal hydroxide solution to obtain a uranium containing solution admixed with insoluble material containing uranium, separating said insoluble material from said solution, and separately recovering said uranium from said solution and said insoluble material.

4. A method of reclaiming uranium from a tungsten part employed in the electromagnetic separation of uranium isotopes which comprises electrostripping said part in an aqueous 10–20% alkali metal hydroxide solution to obtain a uranium containing solution admixed with insoluble material containing uranium, separating said insoluble material from said solution, and separately recovering said uranium from said solution and said insoluble material.

5. A method of recovering uranium from a tungsten part employed in the electromagnetic separation of uranium isotopes which comprises immersing said part in an aqueous sodium hydroxide solution, passing a current through said part to obtain a uranium containing solution admixed with insoluble material containing uranium, separating said insoluble material from said solution, fusing said insoluble material with a molten inorganic sodium salt, leaching said fused material with water to obtain a second uranium containing solution, and recovering uranium from said uranium containing solutions.

6. A method of recovering uranium from a tungsten part employed in the electromagnetic separation of uranium isotopes which comprises immersing said part in an aqueous 10–20% sodium hydroxide solution, passing a current through said part to obtain a uranium containing solution admixed with insoluble material containing uranium, separating said insoluble material from said solution, fusing said insoluble material with water with sodium acid sulfate, leaching said fused material to obtain a second uranium containing solution, and recovering uranium from said uranium containing solutions.

References Cited in the file of this patent

UNITED STATES PATENTS

| 1,050,796 | Bleeker | Jan. 21, 1913 |
| 1,927,773 | Chittum | Sept. 19, 1933 |

FOREIGN PATENTS

| 30,195 | Australia | June 1, 1931 |

UNITED STATES PATENT OFFICE

CERTIFICATE OF CORRECTION

Patent No. 2,872,394                            February 3, 1959

Kenneth Newnam

It is hereby certified that error appears in the printed specification of the above numbered patent requiring correction and that the said Letters Patent should read as corrected below.

Column 4, line 10, strike out "with water" and insert the same after "material" in line 11, same column.

Signed and sealed this 14th day of July 1959.

(SEAL)
Attest:

KARL H AXLINE                                    ROBERT C. WATSON
Attesting Officer                                 Commissioner of Patents